April 13, 1965 R. D. WOODSON ETAL 3,178,632
CONTINUING POWER SUPPLY SYSTEM
Filed Sept. 26, 1961
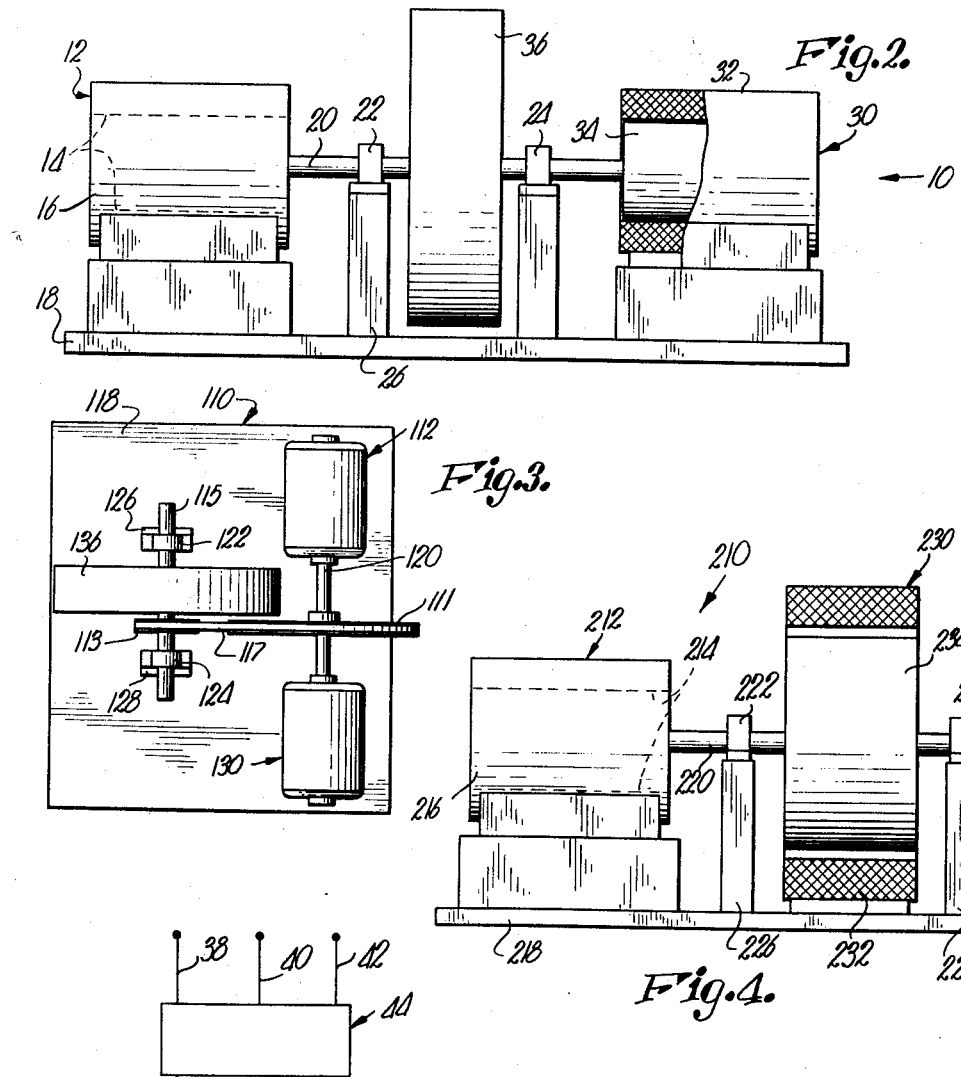
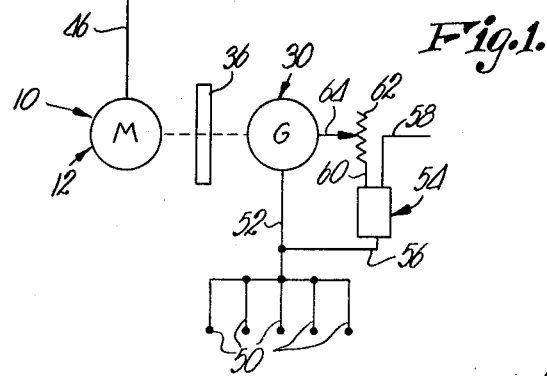
INVENTORS.
Riley D. Woodson
BY Howard F. Spainhour
ATTORNEYS.

United States Patent Office 3,178,632
Patented Apr. 13, 1965

3,178,632
CONTINUING POWER SUPPLY SYSTEM
Riley D. Woodson, 2012 W. 50th Terrace, and Howard F. Spainhour, 2719 W. 50th Terrace, both of Shawnee Mission, Kans.
Filed Sept. 26, 1961, Ser. No. 140,940
4 Claims. (Cl. 322—4)

This invention relates to constant power supply systems, and more particularly to a system for providing a continuing supply of alternating current electrical energy having acceptable frequency and voltage characteristics even during relatively long interruptions or variations of the primary electrical energy source.

Despite the efforts which are made to provide continuous and uninterrupted alternating current electrical energy by electricity generating stations, such fluctuations in the provided electrical energy do occur. The fluctuations may come about through wide voltage variations which may result from the application of large loads to the line, interruptions in the power supply during transfer from one circuit to another, errors, and other similar factors. Most power supply stations are provided with self-sensing, switching devices for automatically returning the output to a normal condition after a variation or interruption occurs. Such devices help to minimize the time during which the electrical output is not normal, but no practical method is known for completely eliminating the fluctuations in the electrical output of such stations. Some systems, equipment and devices to perform functions such as indicating, recording, protecting, control and the like require a containing supply of electrical energy and cannot tolerate extreme variations in the power supply of even relatively short duration. Inasmuch as it is generally recognized that vital systems, equipment and devices should be normally energized or supplied with electrical energy so that, in case of failure or interruption of the electrical supply, the function of such equipment can be arranged to "fail-safe" under all circumstances, and since a reliable source of alternating current electrical energy has not formerly been available, and further, inasmuch as heretofore it has not been realized that many such systems and equipment and devices could be designed to function satisfactorily when supplied with a continuing supply of alternating current electrical energy of widely varying frequency and voltage, it has been necessary in the past, in order to achieve fail-safe systems, to provide equipment and devices of this nature with a supply of direct current from a relatively continuous source such as batteries. However, such direct current systems have technical limitations and are not fully satisfactory. Furthermore, inasmuch as systems, equipment and devices have heretofore been subject to many malfunctions and failures, many such systems, equipment and devices have been designed to be normally de-energized so that the electrical energy supply has been connected only when the system, equipment or device functioned. Such designs are inherently deficient in that the components of the system will not perform their function if the electrical power supply is interrupted at the time the function is to be performed, constituting a fundamentally non-fail-safe system.

Accordingly, it is the most important object of our instant invention to provide a practical and satisfactorily designed system for equipment and devices utilizing a continuing supply of alternating current electrical energy, the frequency or voltage of which can and will vary within wide limits, and which systems, equipment and devices will be normally energized or supplied with alternating current electrical energy and which will have inherently fail-safe characteristics.

Another important object of the instant invention is to provide a suitable apparatus utilizing commercially available alternating current electrical energy as a primary source of energy to produce a reliable continuing supply of alternating current electrical energy for successfully powering the system, which electrical supply will normally have reasonably constant frequency and voltage characteristics but which, in case of failure of the primary source of energy, will supply continuing atlernating current electric energy of widely varying but acceptable frequency and voltage characteristics. One suitable apparatus for accomplishing the foregoing object is a motor generator unit embodying high mechanical inertia.

A still further important object of the instant invention is to provide a motor-generator unit having high inertia components in order to supply continuing alternating current electrical energy, yet being simply constructed to permit economical manufacture and easy access to the components for maintenance.

Yet another object of this invneiton in connection with the foregoing object, is the provision of a simple reliable motor-generator unit direct coupled with a high inertia stabilizing flywheel device wherein the flywheel device is mounted between and the entire unit is rotatably supported by only two bearings, the rotating parts of either or both the motor and generator being constructed integrally as a part of the flywheel device, or the rotating parts of either or both the motor and generator being mounted on overhung shaft extensions beyond the bearings, thereby greatly reducing the problems of alignment and the like which would be encountered with a greater number of bearings.

Still other objects of this invention will be pointed out or become more apparent in the specification.

In the drawing:

FIGURE 1 is a diagram showing a continuing power system electrically coupled to a fluctuating source of alternating current electrical energy and with a series of circuits to equipment or devices utilizing the continuing supply of alternating current electrical energy, the frequency and/or voltage of which is variable within wide limits; which system will be normally energized or supplied from a commercially available source of alternating current electrical energy, and which system will utilize a motor-generator unit having high mechanical inertia in order to continue the operation of the generator and the supply of electrical energy to the utilization circuits during relatively long periods of interruption in the primary electrical supply and in the driving force produced by the motor. The system described being normally energized or connected to the electrical supply provides the inherently fail-safe characteristics desired;

FIGURE 2 is a front elevation view of one form of the continuing power supply motor-generator units, parts of the motor and generator being broken away and shown in cross section to reveal details of construction;

FIGURE 3 is a plan view on a reduced scale of another form of the invention; and FIGURE 4 is a front elevational view of yet another form of the invention, parts of the motor and generator being broken away and shown in cross section to reveal details of construction.

Briefly, this invention relates to a system for adapting readily available, commercial alternating current electrical power for use to provide continuing power for equipment and devices which can utilize widely varying frequency or voltage or both. A constant speed induction motor is electrically coupled with the commercial source of electrical energy which is subject to fluctuations or interruptions of output during given short intervals, and motor drives a shaft to which is coupled a high mechanical inertia flywheel. The rotor of a generator is also mounted on the shaft and is normally driven by the motor. The output of the generator is electrically coupled with the equipment and devices which require a continuing source of electrical energy.

During short intervals of variation of voltage or complete interruption in the primary power supply to the motor, and during which intervals the motor ceases to uniformly drive the generator to produce a uniform electrical output therefrom, the stored mechanical energy in the high inertia flywheel provides the necessary motivating power to continue uninterrupted operation of the generator producing continuing electrical energy having acceptable frequency and voltage characteristics. The flywheel is designed to provide such energy for a long enough time to permit the primary power source or sources to return normal power to the motor.

A continuing power supply device broadly numerated 10 in FIGURE 2, includes a motor 12 having rotating part or rotor 14 indicated in dashed lines, and a stator 16 which is rigidly secured to a base 18. Rotor 14 is mounted upon a shaft 20 which extends outwardly from one end of motor 12 and is journalled in anti-friction devices such as bearings 22 and 24 which are preferably mounted atop a pair of upright supports 26 and 28 respectively.

The supports 26 and 28 are secured to base 18 and maintain shaft 20 in spaced relationship from base 18. A generator broadly designated 30, has a stator 32 rightly mounted to base 18 and a rotor 34 carried by the opposite end of shaft 20 from motor 12. An inertia device 36 which may be flywheel or the like, is rigidly mounted upon shaft 20 for rotation with the latter, and in this embodiment, is situated between supports 26 and 28.

An alternate form of a continuing power supply device is broadly enumerated 110 in FIGURE 3 and includes a motor 112 and a generator 130. A shaft 120 mechanically couples the rotating parts of motor 112 with the rotor of generator 130 for driving the later. A pulley wheel 111 is rigidly mounted on shaft 120 and is aligned with a second pulley wheel 113 which is affixed to an axle 115 which is journalled in bearings 122 and 124 which are maintained in space relationship from base 118 by upright supports 126 and 128 respectively. Flywheel 136 is rigidly secured to axle 115 for rotation with the later in bearings 122 and 124. A V-belt or the like 117, cooperates with wheels 111 and 113 to provide driving means for flywheel 136 as will be explained more fully later.

Another form of a continuing power supply device is shown in FIGURE 4. The generator is designated 212, with stator 216 rigidly mounted to base 218, and the rotor 214 mounted upon shaft 220 which extends outwardly from one end of the motor 230.

Horizontally spaced upright bearing supports 226 and 228 are secured to base 218. Shaft 220 rotates in journal bearings 222 and 224 respectively. In this form, however, motor 230 is situated between supports 226 and 228 and comprises a stator 232 rigidly secured to base 218 and an enlarged motor 234 of motor 230 serves as high mechanical inertia device or flywheel to supply stored energy to the generator.

Referring now to FIGURE 1, a conventional, commercially available source of electrical energy is shown schematically as including three alternate power supply lines 38, 40 and 42. The lines 38, 40 and 42 are electrically coupled with switching apparatus 44 for automatically switching an output line 46 from a respective line 38, 40 or 42 should the power from one of these lines fail for some reason or another. It is to be understood that output line 46 is to be coupled to but one line 38, 40 or 42 at any given time, and the lines 38, 40 or 42 will preferably be coupled with independent sources of electrical energy. The precise components of switching apparatus 44 are quite conventional, constitute no part of this invention per se, and are shown schematically only. It suffices to say that apparatus 44 includes components which are sensitive to interruptions in the supply of power to line 46 and automatically switch from a faulted circuit to one which is capable of providing power. Motor 12 is electrically coupled with the primary source of electrical energy through line 46.

The mechanical coupling of inertia device 36 and generator 30 to motor 12, may be in any manner shown in FIGURES 2, 3 and 4, or any other suitable manner not inconsistent with the teachings of this invention. The mechanical connection is such that motor 12 normally drives device 36 and generator 30, and device 36 is mechanically coupled with generator 30 for providing power to the later should motor 12 falter or fail to provide uniform motivating power. The output of generator 30 is electrically coupled with a series of feeder lines 50 through line 52. It will be understood that lines 50 are adpted for coupling with any equipment, devices or apparatus to be provided with continuing power. Such equipment and devices may be in the nature of control apparatus, recording instruments, computers, automatic switching devices, protective devices or the like.

A voltage regulator broadly designated 54, is electrically coupled to line 52 with line 56, and is capable of sensing the output from generator 30. Regulator 54 is provided with components (not shown) which automatically adjusted the exciting of generator 30 conditioned upon the output thereof to provide substantially uniform output voltage. Regulator 54 is coupled through line 58 with a source (not shown) of suitable direct current electrical energy for exciting the generator 30, and such energy is conducted to generator 30 through line 60, resistor 62 and line 64. Resistor 62 is of the variable type and is automatically varied by regulator 54 to maintain the voltage output at a substantially constant level.

Although the schematic diagram of FIGURE 1 shows a variable resistor type control of the exciting energy, such control forms no part of this invention per se and any suitable type of excitation for generator 30 may be provided. If it is not desired to maintain the output from generator 30 at a constant voltage, and it is only desired to maintain a continuous output at either constant or variable voltage, then generator 30 may be provided with permanent field magnets. In that event, it will be readily understood that there will be no need to incorporate a voltage regulator into the system.

In operation, device 10 is provided with any suitable source of electrical energy which will normally be in the form of commercially available, constant frequency, electrical energy. Such energy is conducted to motor 12 which will normally be a constant speed, induction motor or the like. Motor 12 drives shaft 20, which in turn is coupled with an inertia device in the nature of a flywheel 36, and the rotor 34 of the generator 30. As long as the energy from the primary source remains at a constant voltage, motor 12 will operate uniformly driving flywheel 36 and rotor 34. The uniform rotation of rotor 34 will, of course, provide a constant output from generator 30 which may be supplied ot utilizing devices as previously explained. However, commercial sources of electrical energy do not remain at a constant voltage. Through breaks in the circuit, overload to the power stations, and other occurrences, fluctuations in the voltage provided by such sources, are inevitable. These sources are normally provided with automatic switching apparatus to minimize the time of such deviations from normal voltage however, any deviations may disrupt certain forms of sensitive instruments.

When such fluctuations or deviations in the power output from the source occur, the driving force of motor 12 is adversely affected. However, the provision of flywheel 36 which stores the mechanical energy of rotation therein, takes over during such periods of impairment of the motivation by motor 12, and continues the rotation of shaft 20 and rotor 34 throughout the lag of effective power supply from the source. The inertia of flywheel 36 is calculated to continue the rotation for the necessary period, but it is normally anticipated that such rotation by flywheel 36 for a minute or a minute and a half, will be sufficient for the automatic switching devices in the primary circuitry to resume normal primary power.

One embodiment of device 10 as shown in FIGURE 2 incorporates a flywheel 36 rotating upon extended shaft 20 which is supported on either side of flywheel 36 at bearings 22 and 24. This design provides maximum stability at the region of the concentration of the greatest mass, but eliminates the use of a greater number of bearings in supporting shaft 20 and the components mounted thereon. By utilizing only two bearings, a simply constructed, effective machine can be provided without encountering any problems of alignment or the like which would occur if a greater number of bearings were utilized. An additional advantage of this construction is that the wearing surfaces, bearings 22 and 24, and the rotating parts of the motor and generator are readily accessible and may be replaced or repaired when necessary with a minimum of dismantling of device 10.

The form of the invention illustrated in FIGURE 3 allows for an increase or reduction of the driven speed of flywheel 136 from the normal rotating speed of shaft 120. By carefully correlating the respective sizes of wheels 111 and 113, it is possible to provide the required speed of rotation to shaft 120 by flywheel 136 as the latter is called upon to motivate the rotor of generator 130 in order to supply continuing electrical energy to the utilizing devices.

The form of the invention illustrated in FIGURE 4 may be advantageous for some purposes in that a separate flywheel and motor has been eliminated by the combining of these components into one assembly. By enlarging the rotor 234 (and perhaps increasing the weight thereof) the latter serves as a flywheel to store mechanical energy of rotation for utilization during the periods of power lag to motor 230.

Although the specific forms of construction of device 10 illustrated in FIGURES 2, 3 and 4 have been explained in detail, additional forms of construction could be utilized without departing from the spirit of the teachings of this invention.

Additionally, no attempt has been made to exhaust the specific applications of this invention. On the contrary, the utilization of device 10 into one system, has been shown as exemplary only and there is no intention to limit the scope of this invention to such a system.

Having thus described the invention, what is claimed as new and desired to be secured by Letters Patent is:

1. Apparatus for supplying alternating current electrical energy of substantially constant voltage to a substantially constant load adapted to tolerate changes in frequency but not voltage and for producing said energy from a main power source of alternating current electrical energy subject to temporary interruption, said apparatus comprising:

an electric motor electrically coupled with said main source and having a rotor driven by energy from the latter;

flywheel means mechanically coupled with said motor rotor;

an alternating current generator having a rotor mechanically coupled with said motor rotor, an excitation connection, and an output connection;

means for electrically coupling said output connection with said load;

an auxiliary power source of direct current electrical energy of substantially constant voltage; and regulator means electrically coupling said auxiliary source with said excitation connection, said regulator means being electrically coupled with said output connection for adjusting the excitation to said generator responsive to the voltage level of the generator output from said output connection to maintain said voltage level of the generator output substantially constant during temporary periods of interruption of said main source and resultant decrease in the frequency of said generator output during said periods when said generator rotor is being mechanically driven only by the inertia of said flywheel means, whereby to provide said alternating current electrical energy of substantially constant voltage at said output connection of the generator.

2. The invention of claim 1, wherein said regulator means includes circuit means provided with a variable resistance, said circuit means electrically coupling said auxiliary source with said excitation connection, and means electrically coupled with said output connection and coupled with said resistance for automatically varying the latter responsive to said voltage level of the generator output.

3. The invention of claim 1, wherein is provided an alternate power source of alternating current electrical energy and switching means electrically coupled with said main source, said alternate source, and said motor for automatically connecting the latter to said alternate source for driving said motor rotor during said periods of interruption of the main source.

4. In a power supply system for use with an alternating current electrical source subject to fluctuations of voltage level, temporary interruptions or both, and load apparatus requiring a supply of alternating current electrical energy of substantially constant voltage but adapted to successfully function at varying frequencies when such fluctuations or interruptions of the source are experienced:

electro-mechanical means for generating an alternating current electrical output, said means including structure for receiving electrical excitation, structure for deriving and presenting said electrical output, and mechanical means for producing, when actuated, relative motion between said structures, said electro-mechanical means being so arranged that the frequency and voltage level of said output are normally decreased when the amount of relative motion between said structures is decreased;

an electrically responsive prime mover mechanically coupled with said mechanical means for actuating the latter and adapted to be coupled with said alternating current source for operation of said prime mover, said prime mover being so arranged that the amount of actuation imparted thereby to said mechanical means is decreased when the voltage received by said prime mover from said source decreases;

inertia means operably coupled with said mechanical means for resisting changes in the amount of actuation being imparted to said mechanical means;

means for electrically coupling the output of said electromechanical means with said load;

excitation supply means electrically coupled with said excitation structure of said electro-mechanical means for supplying electrical excitation thereto; and control means operably coupled with said excitation supply means and said output structure, said control means being responsive to decreases in the voltage level from said output structure and operative to increase the excitation supplied to said excitation structure by said excitation supply means when the voltage from said output structure decreases, said control means being so arranged that, within wide limits, the tendency for the voltage level from said output structure to decrease responsive to decreases in the amount of actuation of said mechanical means will be exactly offset by increases in the electrical excitation supplied to said excitation structure, whereby the voltage level of said output to be supplied to said load from said output structure will be maintained substantially constant.

References Cited by the Examiner
UNITED STATES PATENTS

| | | | |
|---|---|---|---|
| 912,074 | 2/09 | Clark | 322—4 |
| 1,476,978 | 12/23 | Jeffrey | 322—4 |
| 2,480,635 | 8/49 | Dawson | 322—4 |
| 2,911,541 | 11/56 | Neufville et al. | 322—4 |

LLOYD McCOLLUM, *Primary Examiner.*

MILTON O. HIRSHFIELD, *Examiner.*